(12) United States Patent
Ogawa

(10) Patent No.: US 11,435,870 B2
(45) Date of Patent: *Sep. 6, 2022

(54) INPUT/OUTPUT CONTROLLER AND INPUT/OUTPUT CONTROL PROGRAM

(71) Applicant: 138 EAST LCD ADVANCEMENTS LIMITED, Sandyford (IE)

(72) Inventor: Tomohiro Ogawa, Shiojiri (JP)

(73) Assignee: 138 EAST LCD ADVANCEMENTS LIMITED, Sandyford (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/035,158

(22) Filed: Sep. 28, 2020

(65) Prior Publication Data

US 2021/0011611 A1    Jan. 14, 2021

Related U.S. Application Data

(63) Continuation of application No. 14/944,516, filed on Nov. 18, 2015, now Pat. No. 10,788,950.

(30) Foreign Application Priority Data

Dec. 1, 2014    (JP) ................................. 2014-242877

(51) Int. Cl.
*G06F 3/0481* (2022.01)
*G06F 3/04817* (2022.01)
(Continued)

(52) U.S. Cl.
CPC ........ *G06F 3/04817* (2013.01); *G06F 3/0486* (2013.01); *G06F 3/04883* (2013.01); *G06F 2203/04808* (2013.01)

(58) Field of Classification Search
CPC ............................................. G06F 2203/04808
See application file for complete search history.

(56) References Cited

U.S. PATENT DOCUMENTS 8,799,821 B1 * 8/2014 De Rose ............. G06F 3/04845
715/848
8,839,130 B2    9/2014 Tanaka et al.
(Continued)

FOREIGN PATENT DOCUMENTS

JP    2004038260 A    2/2004
JP    2010176568 A    8/2010
(Continued)

OTHER PUBLICATIONS

Google Translation of JP 2010176568 A, retrieved on May 16, 2021, available at <<https://patents.google.com/patent/JP2010176568A/en?oq=jp2010176568>>, 13 pages (Year: 2021).*
(Continued)

*Primary Examiner* — Daniel Rodriguez
(74) *Attorney, Agent, or Firm* — Kunzler Bean & Adamson

(57) ABSTRACT

Provided is an input/output controller including: a touch panel display; and a control section configured to cause the touch panel display to display a first icon at a first position on the touch panel display and, when one or more other positions are touched while the first position is touched, perform a process associated with the first icon and the one or more other positions.

48 Claims, 5 Drawing Sheets

(51) Int. Cl.
*G06F 3/04883* (2022.01)
*G06F 3/0486* (2013.01)

(56) References Cited

U.S. PATENT DOCUMENTS

| | | | |
|---|---|---|---|
| 9,158,447 B2 * | 10/2015 | Fujii | G06F 3/1438 |
| 9,430,139 B2 | 8/2016 | Homma et al. | |
| 9,626,071 B2 * | 4/2017 | Lee | G06F 3/04817 |
| 9,626,098 B2 * | 4/2017 | Migos | G06F 3/0488 |
| 10,180,714 B1 * | 1/2019 | Kin | G06F 3/04883 |
| 2008/0184112 A1 * | 7/2008 | Chiang | G06F 3/0482 |
| | | | 715/700 |
| 2009/0058821 A1 * | 3/2009 | Chaudhri | G06F 3/04842 |
| | | | 345/173 |
| 2010/0070931 A1 * | 3/2010 | Nichols | G06F 3/0488 |
| | | | 715/863 |
| 2010/0162153 A1 * | 6/2010 | Lau | H04M 3/563 |
| | | | 715/810 |
| 2010/0283747 A1 * | 11/2010 | Kukulski | G06F 3/041 |
| | | | 345/173 |
| 2010/0295795 A1 * | 11/2010 | Wilairat | G06F 3/04883 |
| | | | 345/173 |
| 2010/0295802 A1 * | 11/2010 | Lee | G06F 1/1643 |
| | | | 345/173 |
| 2011/0157054 A1 * | 6/2011 | Chang | G06F 3/04883 |
| | | | 345/173 |
| 2011/0164055 A1 * | 7/2011 | McCullough | G06F 3/04883 |
| | | | 345/642 |
| 2011/0181528 A1 * | 7/2011 | Capela | G06F 3/04845 |
| | | | 345/173 |
| 2011/0209104 A1 * | 8/2011 | Hinckley | G06F 3/04883 |
| | | | 715/863 |
| 2012/0030568 A1 * | 2/2012 | Migos | G06F 3/0486 |
| | | | 345/173 |
| 2012/0052918 A1 * | 3/2012 | Yang | G06F 3/04817 |
| | | | 455/566 |
| 2012/0084647 A1 | 4/2012 | Homma et al. | |
| 2012/0182224 A1 * | 7/2012 | Waas | G06F 3/04883 |
| | | | 345/173 |
| 2012/0240082 A1 * | 9/2012 | Chen | G06F 3/04812 |
| | | | 715/810 |
| 2012/0297329 A1 | 11/2012 | Tanaka et al. | |
| 2013/0127749 A1 * | 5/2013 | Yamamoto | G06F 3/0488 |
| | | | 345/173 |
| 2013/0155072 A1 * | 6/2013 | Chiu | G06F 3/04817 |
| | | | 345/173 |
| 2013/0293486 A1 * | 11/2013 | Nave | G06F 3/041 |
| | | | 345/173 |
| 2014/0013254 A1 * | 1/2014 | Hosein | G06F 3/04883 |
| | | | 715/765 |
| 2014/0013271 A1 * | 1/2014 | Moore | G06F 3/04883 |
| | | | 715/792 |
| 2014/0140242 A1 * | 5/2014 | Xiao | H04L 69/08 |
| | | | 370/254 |
| 2014/0149903 A1 * | 5/2014 | Ahn | G06F 3/0484 |
| | | | 715/765 |
| 2014/0189501 A1 * | 7/2014 | Demiralp | G06F 40/279 |
| | | | 715/764 |
| 2014/0218393 A1 * | 8/2014 | Lee | G06F 3/04883 |
| | | | 345/619 |
| 2014/0317326 A1 * | 10/2014 | Miura | G06F 1/3234 |
| | | | 710/260 |
| 2014/0344735 A1 * | 11/2014 | Wang | G06F 16/904 |
| | | | 715/765 |
| 2015/0033161 A1 * | 1/2015 | Lawson | G06F 3/0486 |
| | | | 715/765 |
| 2015/0089413 A1 * | 3/2015 | Asayama | G06F 3/0484 |
| | | | 715/765 |
| 2015/0089421 A1 * | 3/2015 | Kagei | G06F 3/04817 |
| | | | 715/769 |
| 2015/0168997 A1 * | 6/2015 | Matsuoka | G06F 3/0412 |
| | | | 345/174 |
| 2015/0199073 A1 * | 7/2015 | Kukulski | G06F 3/0488 |
| | | | 345/173 |
| 2016/0034151 A1 * | 2/2016 | Yang | G06F 3/04842 |
| | | | 715/765 |
| 2017/0160926 A1 * | 6/2017 | Barkway | G06F 3/0481 |

FOREIGN PATENT DOCUMENTS

| | | |
|---|---|---|
| JP | 2011164923 A | 8/2011 |
| JP | 2012079156 A | 4/2012 |
| JP | 2012159981 A | 8/2012 |
| JP | 2012243163 A | 12/2012 |
| JP | 2013200680 A | 10/2013 |

OTHER PUBLICATIONS

IPod screenshots (Model MC544LL/A loaded with iOS 6.1.6), taken on Mar. 22, 2019, pp. 1-5.

Apple.com, "iOS 6.1.6", posted Feb. 21, 2014, available at https://support.apple.com/kb/DL1722?locale=en_US , pp. 1-1.

* cited by examiner

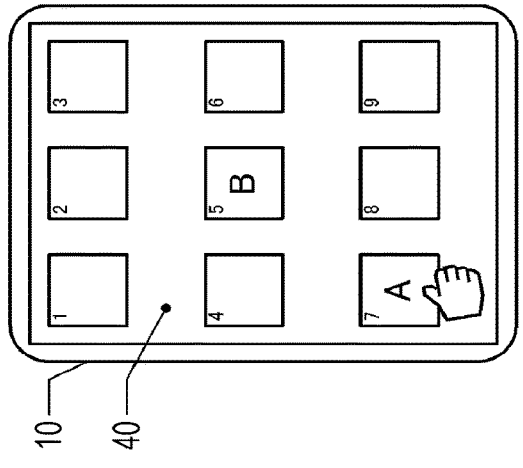
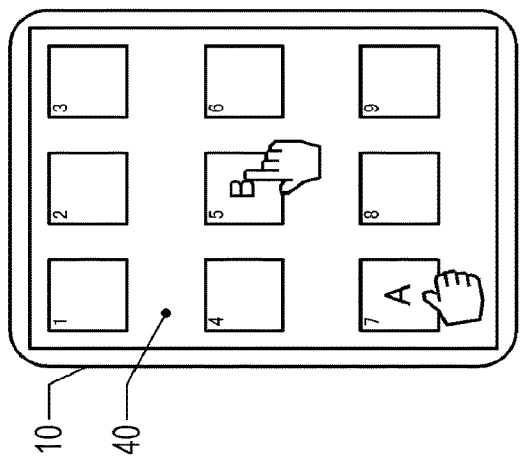
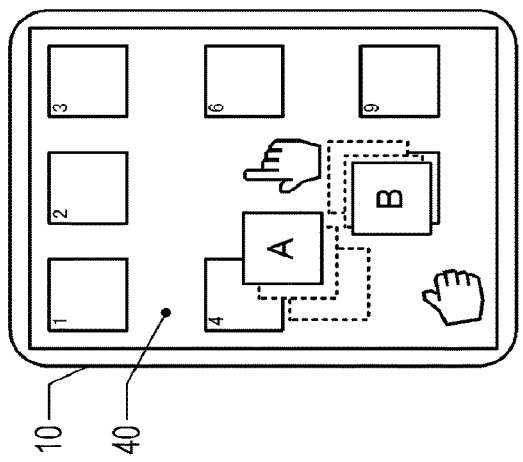
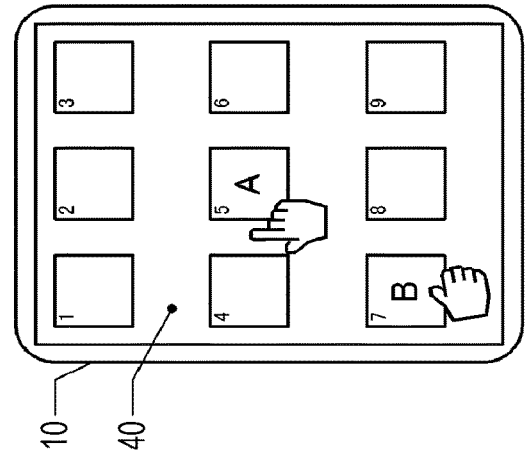
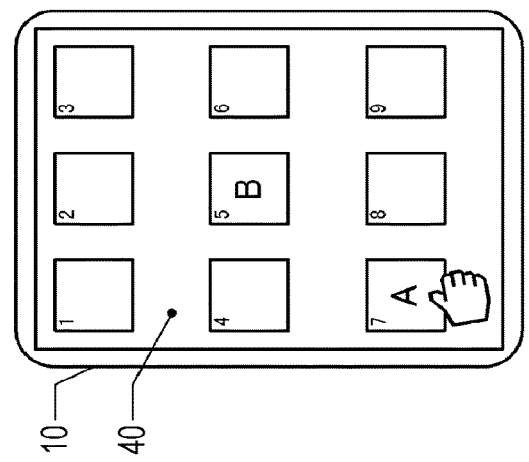

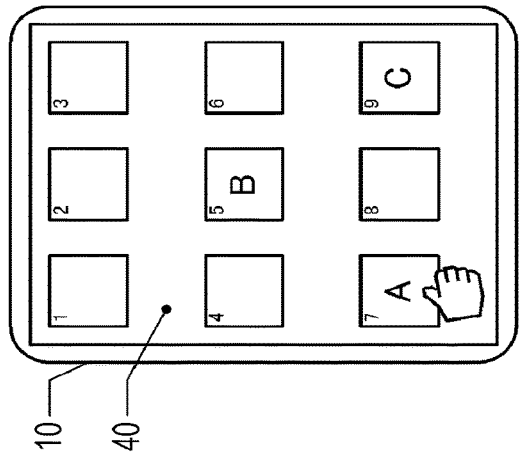
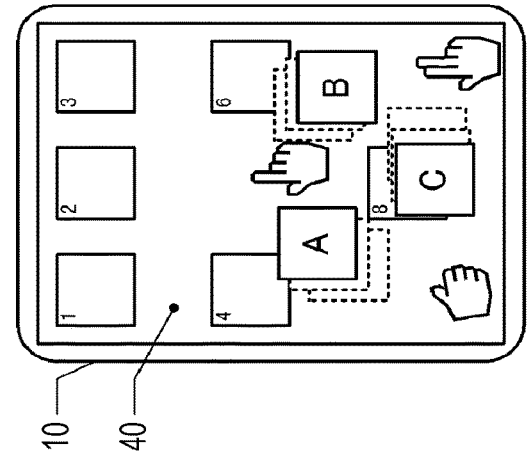
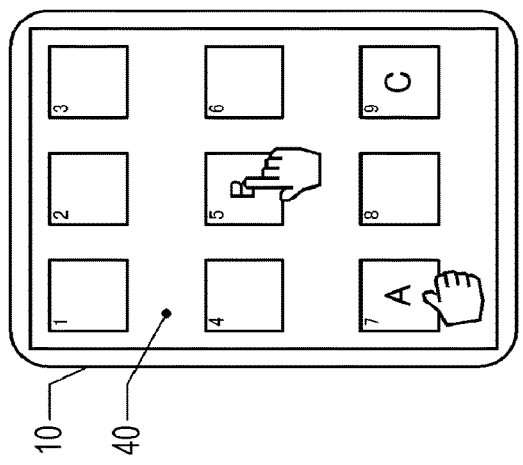
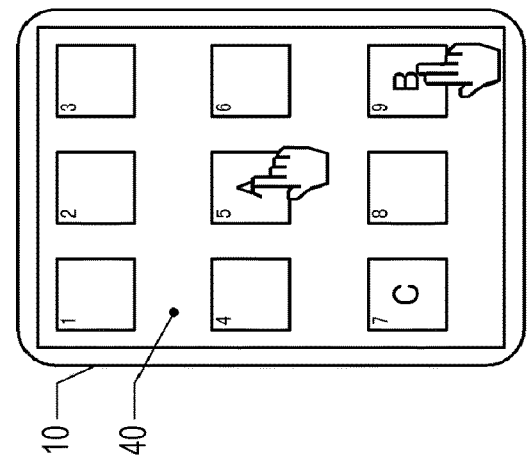
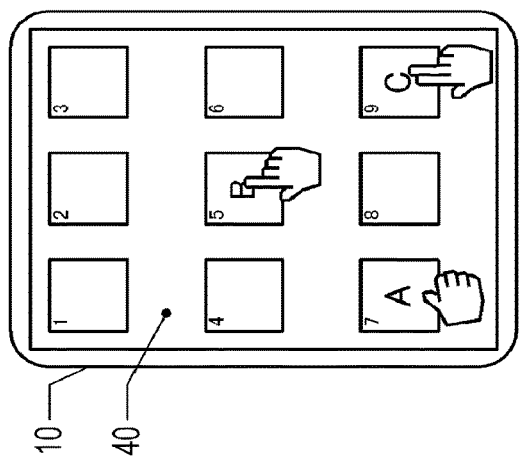
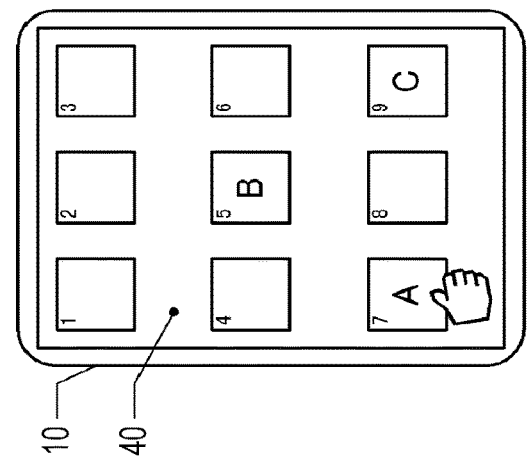

//INPUT/OUTPUT CONTROLLER AND INPUT/OUTPUT CONTROL PROGRAM

CROSS REFERENCES TO RELATED APPLICATIONS

This application is a continuation of U.S. patent application Ser. No. 14/944,516, filed Nov. 18, 2015, which claim priority to Japanese Patent Application No. 2014-242877, filed Dec. 1, 2014, all of which are incorporated by reference herein in their entirety.

BACKGROUND

1. Technical Field

The present invention relates to an input/output controller and an input/output control program.

2. Related Art

There is known a technique that enables manipulation of icons via touching of a touch panel display. For example, JP-A-2004-38260 discloses a configuration in which: a plurality of options are displayed; and when an option is pressed and held for a predetermined time period, the option is moved to the top of the list.

With the above-mentioned known technique, it is not possible to perform operations associated with the user's intended positions. For example, it is not possible to move the icon to an intended position other than the top of the list.

SUMMARY

An advantage of some aspects of the invention is that a technique that enables operations associated with positions intended by a user is provided.

An input/output controller according to an aspect of the invention includes a touch panel display; and a control section configured to cause the touch panel display to display a first icon at a first position on the touch panel display and, when one or more other positions are touched while the first position is touched, perform a process associated with the first icon and the one or more other positions. Specifically, when two or more positions on the touch panel display are touched by a user, the control section performs a process associated with these positions.

With this configuration, the user can cause the control section to perform an operation associated with the user's intended positions.

The touch panel display may include: a display configured to display images; and a sensor configured to detect a touch operation at a plurality of positions on the display. The size of the display is not limited. The display may be of a size that can be operated with one hand or may be of a size that needs to be operated with both hands. Furthermore, the touch panel display may be a part of any device. Examples of the device include: mobile terminals such as smartphones and tablets; onboard displays; displays of personal computers; and the like.

The control section is not particularly limited, provided that the control section is configured to cause the touch panel display to display a first icon at a first position and, when one or more other positions are touched while the first position is touched, perform a process associated with the first icon and the one or more positions. Specifically, the control section is capable of controlling images displayed on the touch panel display and detecting the positions of touch operations on the touch panel display. With this configuration, the control section performs a process associated with two or more touched positions.

The first icon is an icon displayed at the first position, and the image of the icon is not limited as to shape, size, color, dimensions and the like. Therefore, any of the icons displayed on the touch panel display can be the first icon. Specifically, among a plurality of displayed icons, the icon on which the first touch operation is performed is the first icon. The first position is a position where the first icon is displayed and where a user is likely to perform a touch operation on the touch panel display with an intention to touch the first icon. Examples of such a first position include: a region enclosed by the border of the first icon; and a region consisting of the first icon and a certain margin of space around it.

The number of the one or more other positions touched while the first position is touched can be any number. Specifically, the number can be set so that a process associated with the first position and one or more positions other than the first position can be performed. The process associated with the first position and the other positions can be various processes. Examples of processes include: processes regarding displaying icons such as moving or rearranging icons; and processes associated with the icons such as startup of programs indicated by icons or combining of files indicated by icons.

Although the first position is a position where the first icon is displayed, the "other position" may be either a position where an icon is displayed or a position where no icons are displayed. An example of the former is a configuration in which a second position where a second icon distinct from the first icon is displayed serves as an "other position". An example of the latter is a configuration in which a position where an image other than icons is displayed (or nothing is displayed), such as a space between icons, serves as an "other position".

The input/output controller may be configured such that the control section performs, when a second position is touched while the first position is touched, a process of moving the first icon to the second position. That is, the control section performs a process to move the first icon to the user's intended position on the basis of two touched positions. This configuration makes it possible to move the user's intended icon to the user's intended position and thus makes operations on the touch panel display more intuitive.

There can be many situations where the process to move the first icon is to be performed. An example is a situation where a plurality of icons are arranged on the touch panel display. In such a situation, it is possible to rearrange the plurality of icons by placing the first icon between any two icons. Various adjustments can be made when the first icon is moved. For example, the positions of icons can be adjusted so that the icons are equally spaced.

The input/output controller may be configured such that the control section causes the touch panel display to display a second icon at a second position that is distinct from the first position and, when the second position is touched while the first position is touched, performs a process of swapping the positions of the first icon and the second icon. That is, when two displayed icons are both touched at the same time, the control section performs a process to swap the positions of the icons. This configuration makes it possible to swap the positions of the user's intended icons and makes operations on the touch panel display more intuitive.

There can be many situations where the process to swap the positions of two icons is to be performed. An example is a situation where a plurality of icons are arranged on the touch panel display. In such a situation, it is possible to swap the positions of two of the arranged icons by selecting the two icons.

The input/output controller may be configured such that the control section causes the touch panel display to display respective different icons in one or more positions other than the first position, determines, on the basis of the order in which the first position and the one or more positions other than the first position are touched, positions into which the icons are to be rearranged, and performs a process to rearrange the icons into the determined positions. That is, when the user touches two or more of the icons which are displayed in a certain order on the touch panel display, the control section rearranges the icons into the positions determined in accordance with the order in which the icons are touched.

With this configuration, the user can rearrange multiple icons into new positions in a small number of operations. Rearranging icons into new positions can be achieved by a variety of configurations. An example is a configuration in which the control section obtains, as a cyclic sequence (a sequence in which the last icon is connected to the first icon), the order in which the icons are touched, and changes the positions of the touched icons so that each of the icons moves by one or more positions in the cyclic sequence. A more specific example is a configuration in which, in the case where the user touches first, second, and third icons displayed at first, second, and third positions in this order, the control section displays the first icon at the second position, the second icon at the third position, and the third icon at the first position.

The input/output controller may be configured such that the control section determines, on the basis of the order in which the touch operations on the touch panel display have ended, whether to perform or cancel the process. In the case where an instruction to perform the process and an instruction to cancel the process can be made by a touch operation, the input/output controller becomes more intuitive. This is preferable. With such a configuration in which whether to perform or cancel the process is determined on the basis of the order in which the touch operations have ended, the user can provide as a single gesture an instruction to perform the process or an instruction to cancel the process after the operation of specifying the positions of icons.

As has been described, according to an aspect of the invention, there is provided a configuration of, when one or more positions other than the first position are touched while the first position is touched, performing a process associated with the first icon and the one or more positions. Such a configuration is also applicable to programs and methods. The above-described devices, programs, and methods may be realized by a single device or may be realized by parts of a multifunction device which are shared with other functions. The devices, programs, and methods may have various arrangements.

BRIEF DESCRIPTION OF THE DRAWINGS

The invention will be described with reference to the accompanying drawings, wherein like numbers reference like elements.

FIGS. 3A to 3F illustrate examples of the content displayed on the touch panel display.

FIGS. 4A to 4F illustrate examples of the content displayed on the touch panel display.

DESCRIPTION OF EXEMPLARY EMBODIMENTS

Figure 1A:
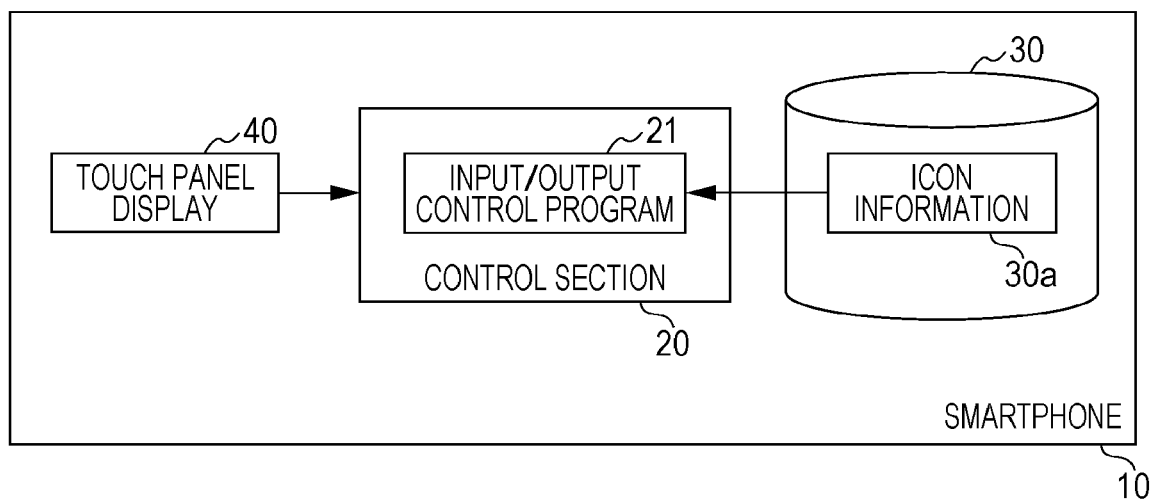
FIG. 1A is a block diagram illustrating one embodiment of the invention.

The following description discusses embodiments of the invention in the following order:
(1) configurations of an input/output controller
(2) an input/output control process
(3) other embodiments (1) Configurations of Input/Output Controller FIG. 1A is a block diagram illustrating a configuration of a smartphone 10, which is one embodiment of the invention. The smartphone 10 includes: a control section 20 including a CPU and a RAM; a ROM 30; and a touch panel display 40. The control section 20 is capable of executing programs stored in the ROM 30. The touch panel display 40 is a device that includes: a display configured to display images; and a sensor configured to detect touch operations at any positions on the display.

In the present embodiment, the control section 20 can execute an input/output control program 21. The control section 20 controls the touch panel display 40 with the processes of the input/output control program 21. Specifically, the control section 20 can cause the touch panel display 40 to display certain images by sending control signals to the touch panel display 40. Furthermore, the control section 20 can determine which position on the display is touched by obtaining a signal from the sensor of the touch panel display 40. That is, on the basis of the touched positions indicated by the signals sequentially received from the touch panel display 40, the control section 20 can determine which positions on the touch panel display 40 are touched by a user and the order in which the positions are touched by the user.

With the input/output control program 21, the control section 20 provides a user interface having a plurality of icons. Specifically, in the present embodiment, icons indicative of application programs executable by the control section 20 are arranged on the touch panel display 40 and, when the control section 20 receives a user's operation of tapping an icon, the control section 20 executes the application program indicated by the tapped icon. In this way, the control section 20 receives instructions to execute application programs while the arranged icons are displayed. Accordingly, in the present embodiment, the icons indicating the respective application programs are predefined, and the icons are stored in the ROM 30 as icon information 30a. Furthermore, the icons are associated with numbers corresponding to their positions in an array of icons, and the positions on the touch panel display 40 where the numbered icons are to be displayed are also predefined.

Figure 2A:
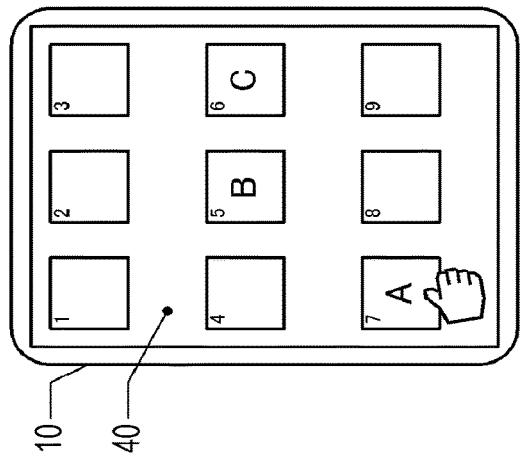
FIGS. 2A to 2F illustrate examples of the content displayed on a touch panel display.

FIG. 2A illustrates an example of the content displayed on the touch panel display 40, which constitutes one surface of the housing of the smartphone 10. FIG. 2A illustrates a state in which square icons are displayed on the touch panel display 40. Specifically, in the present embodiment, nine display positions are predefined so that nine (or any other number of) icons are displayed on the touch panel display 40. The present embodiment employs a configuration in which the icons are displayed in the order of their numbers from left to right and from top to bottom in the predefined positions.

It should be noted that, in FIG. 2A, each icon has, at its top left corner, a number corresponding to its display position. Further note that, in the following description, exemplary icons are assigned characters A, B, C, and so on. For example, the icon which is the 1st in the array of icons (the icon assigned number 1) is displayed at the top left corner, and the icons which are the 7th, 5th, and 6th in the array of icons are displayed in the positions indicated by characters A, B, and C. In the following description, the positions corresponding to the numbers associated with the icons are identified by those numbers (for example, the top left display position is referred to as display position 1, 1st display position, or the like).

When the smartphone 10 is switched on, the icons are arranged in a predefined initial order. The control section 20 obtains images of the icons from the icon information 30a in the initial order and draws images to be displayed on the touch panel display 40 so that the obtained images will be displayed in the respective display positions 1 to 9. Then, the control section 20 sends, to the touch panel display 40, information indicative of the drawn images, whereby a user interface screen, as illustrated in FIG. 2A, is displayed on the touch panel display 40.

In the case of the configuration above in which a plurality of icons are displayed on the touch panel display 40, there may be a need to rearrange icons according to how often the application programs are used by the user or according to various other factors. In view of this, in the present embodiment, the control section 20 is capable of rearranging icons with the processes of the input/output control program 21.

Specifically, with the processes of the input/output control program 21, the control section 20 causes the touch panel display 40 to display a first icon at a first position on the touch panel display 40 and, when one or more other positions are touched while the first position is touched, performs a process associated with the first icon and the one or more positions. In the present embodiment, this process is a process of moving an icon or a process of rearranging icons into new positions.

In the case where a second position on the touch panel display 40 is touched while the first position is touched and where the second position is not on an icon, the control section 20 performs a process of moving the first icon to the second position. That is, the control section 20 is capable of performing a process to move the first icon to a user's intended position on the basis of two touched positions. The control section 20 moves an icon at the position (first position) at which the first touch operation is performed to the position (second position) at which the second touch operation is performed.

Specifically, the control section 20 performs the following. On the basis of a signal from the sensor of the touch panel display 40, the control section 20 obtains, as a first position, a position on the touch panel display 40 at which the first touch operation is performed by a user. Furthermore, on the basis of a signal from the sensor of the touch panel display 40, the control section 20 obtains, as a second position, a position on the touch panel display 40 at which the second touch operation is performed by the user. The second position is not on an icon. It should be noted here that, since the second position is not on an icon, the first icon can be simply moved to the second position on the display. However, in the present embodiment, the icons are associated with numbers corresponding to their positions in the array of icons, as described earlier. Therefore, the control section 20 renumbers icons so that the first icon is in the position in the array of icons specified by the second position and displays the icons in the changed order. In the embodiment, the position at which the second touch operation is performed on the display and the position in the array of icons specified by the second touch operation are both referred to as the second position.

Figure 2B:
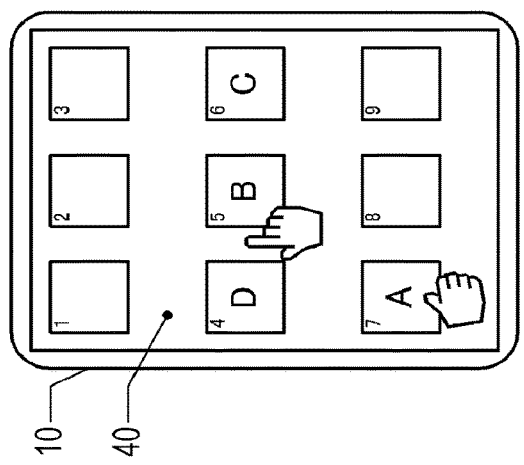

For example, FIG. 2A illustrates an example in which a user touches, with the thumb, a position at which the icon A is displayed. FIG. 2B illustrates an example in which the user touches, with the index finger, a position between the icon D and the icon B (a position where no icons are displayed) with the thumb held in contact with the icon A. When the user provides an instruction to perform a moving process in the state of FIG. 2B, the control section 20 obtains, as a first position, the position at which the icon A is displayed, and obtains, as a second position, the touched position between the icon D and the icon B on the display. Furthermore, the control section 20 obtains information indicating that the icon A at the first position is the 7th in the array of icons, and obtains information indicating that the touched second position is a position between the icon D and the icon B and that the icon D and the icon B are the 4th and 5th respectively in the array of icons. Then, the control section 20 determines that the position in the array of icons specified by the second position is the 5th position in the array of icons.

Figure 2C:
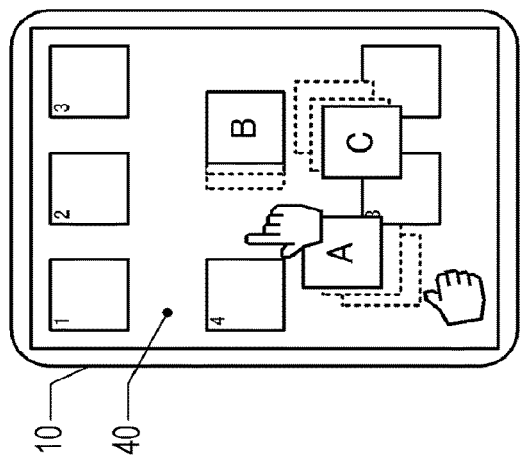
Figure 2D:
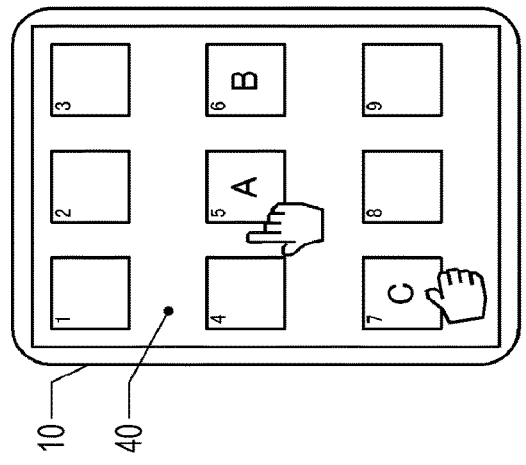

Next, the control section 20 renumbers the icon A so that the icon A is in the 5th position in the array of icons (the position in the array of icons specified by the second position) and renumbers the icons originally in the 5th and 6th positions in the array of icons so that these icons are in the 6th and 7th positions in the array of icons. Specifically, the control section 20 renumbers the icon B and the icon C so that the icon B is in the 6th position in the array of icons and the icon C is in the 7th position in the array of icons. Then, the control section 20 displays the icons in the respective positions in the changed order. More specifically, the control section 20 generates image information indicative of icon images arranged in display positions 1 to 9 in the changed order and sends the information to the touch panel display 40. As a result, as illustrated in FIG. 2D, the icons A, B, and C are displayed in the 5th, 6th and 7th display positions respectively on the touch panel display 40.

With this configuration, the user can move an intended icon to an intended position, and operations on the touch panel display 40 become more intuitive. It should be noted that, in the present embodiment, the user can provide an instruction to perform or cancel the process of moving icons or the process of rearranging icons into new positions. When the user provides an instruction to perform the process in the state of FIG. 2B, a transition occurs from FIG. 2B to FIG. 2E through FIGS. 2C and 2D. This will be described later in detail.

On the other hand, in the case where the second position is touched while the first position is touched and where the second position is on an icon on the display, the control section 20 performs a process of swapping the positions of the first icon and the second icon.

That is, the control section 20 is capable of performing the process of moving the first icon to the user's intended position on the basis of two touched positions. The control section 20 swaps the icon at the position at which the first touch operation is performed (this position is the first position) and the icon at the position at which the second touch operation is performed (this position is the second position).

Specifically, the control section 20 performs the following. On the basis of a signal from the sensor of the touch panel display 40, the control section 20 obtains, as a first position, the position on the touch panel display 40 at which the first touch operation is performed by a user. Furthermore, on the basis of a signal from the sensor of the touch panel display 40, the control section 20 obtains, as a second position, the position on the touch panel display 40 at which the second touch operation is performed by the user. Here, since the second position is on an icon on the display, the control section 20 determines that the icon which overlaps the second position is a second icon. The control section 20 further determines that the position of the second icon in the array of icons is the position in the array of icons specified by the second position. Then, the control section 20 swaps the positions of the first and second icons and displays the icons in the changed order.

For example, FIG. 3A illustrates an example in which a user touches, with the thumb, a position at which the icon A is displayed. FIG. 3B illustrates an example in which the user touches, with the index finger, a position at which the icon B is displayed, with the thumb held in contact with the icon A. When the user provides an instruction to perform a swapping process in the state of FIG. 3B, the control section 20 obtains, as a first position, the position at which the icon A is displayed, and obtains, as a second position, the position at which the icon B is displayed. Furthermore, the control section 20 obtains information indicating that the icon A at the first position is the 7th in the array of icons, and, since the icon B at which the second position exists on the display is the 5th in the array of icons, the control section 20 determines that the position in the array of icons specified by the second position is the 5th position in the array of icons.

Next, the control section 20 renumbers the icon A so that the icon A is in the 5th position in the array of icons (the position in the array of icons specified by the second position) and renumbers the icon B so that the icon B is in the 7th position in the array of icons. Then, the control section 20 displays icons in respective positions in the changed order. Specifically, the control section 20 generates image information indicative of the icon images arranged in display positions 1 to 9 in the changed order and sends the information to the touch panel display 40. As a result, as illustrated in FIG. 3D, the icons A and B are displayed in the 5th and 7th display positions respectively on the touch panel display 40. This configuration makes it possible for the user to swap the positions of icons as desired, and thus makes operations on the touch panel display 40 more intuitive.

(2) Input/Output Control Process

Figure 1B:
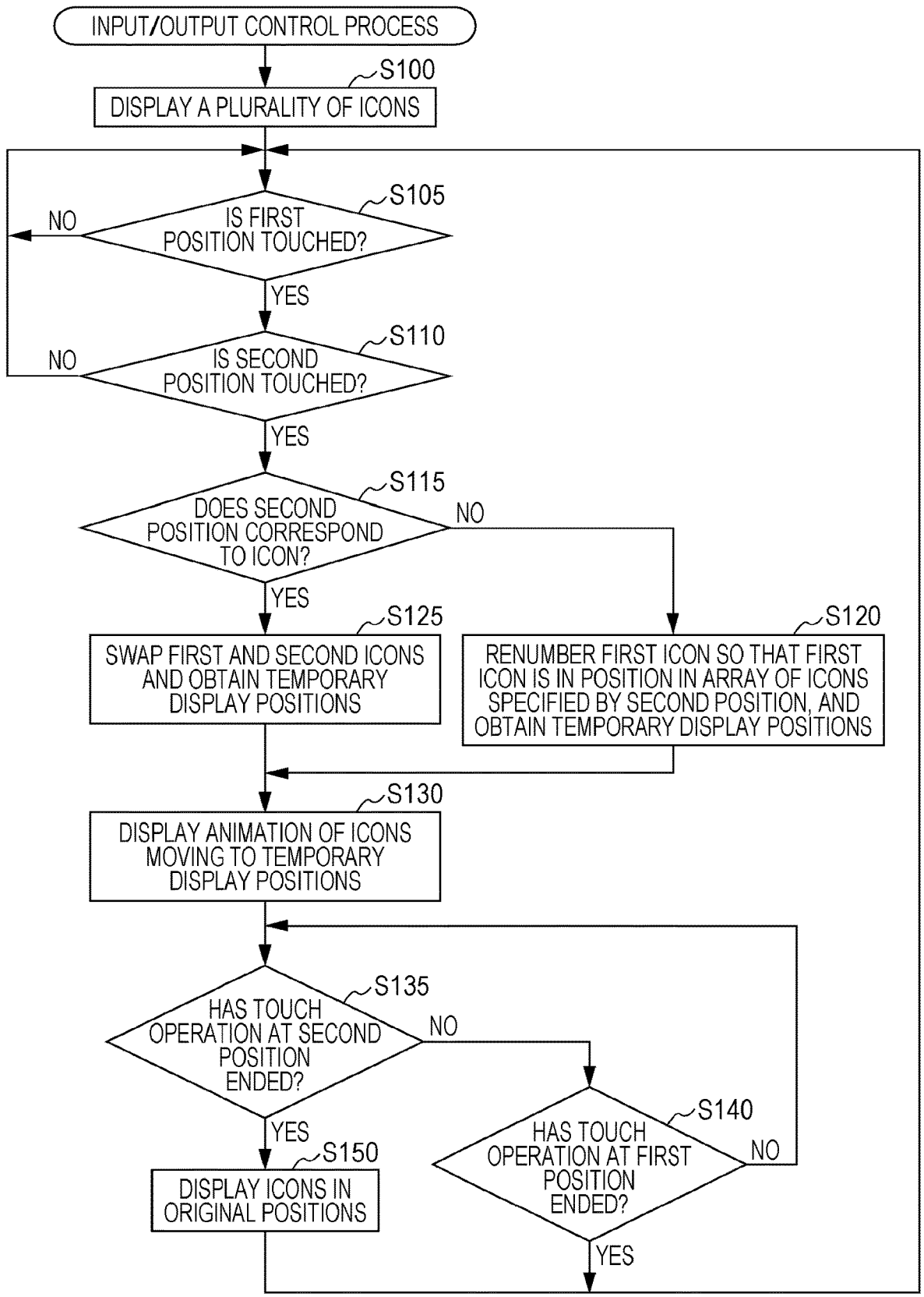
FIG. 1B is a flowchart illustrating an input/output control process.

The following description discusses an input/output control process performed by the control section 20 in detail with reference to the flowchart illustrated in FIG. 1B. In the present embodiment, the control section 20 performs an input/output control process in accordance with the input/output control program 21, while the smartphone 10 is waiting for an operation to execute an application program. The control section 20 can be in a wait state in various cases. Examples of such cases include: when the smartphone 10 itself or an application that runs on the smartphone 10 is started up; when a data entry screen serving as a user interface screen for a default or certain function of the smartphone 10 is displayed; when a user provides an instruction to return to the data entry screen during a certain process; and the like.

When the input/output control process starts, the control section 20 displays a plurality of icons (step S100). Specifically, the control section 20 refers to the icon information 30a and generates image information indicative of icons arranged in the order of their numbers in respective display positions 1 to 9 and sends the information to the touch panel display 40. As a result, as illustrated in FIGS. 2A and 3A, a plurality of icons are displayed on the touch panel display 40. In this state, the control section 20 performs a process to wait for an operation to execute an application program, in parallel with the input/output control process illustrated in FIG. 1B. Specifically, in the case where a certain operation (e.g., a double-tap) is performed on a displayed icon, the control section 20 stops the process of the flowchart illustrated in FIG. 1B and executes the application program specified by the icon that received the operation.

Next, the control section 20 remains in a wait state until it is determined that a first position is touched (step S105). Specifically, the control section 20 remains in a wait state until the control section 20 receives information from the sensor of the touch panel display 40 indicating that one position is touched. In the case where it is determined that a first position is touched in step S105, the control section 20 remains in a wait state until it is determined that a second position is touched (step S110). Specifically, the control section 20 remains in a wait state until the control section 20 receives information from the sensor of the touch panel display 40 indicating that a touch operation is performed at another position before the touch operation at the first position has ended. It should be noted that, in steps S105 to S110, in the case where the touch operation at the first position has ended before a touch operation is performed at another position, the control section 20 returns to step S105.

In the case where it is determined that a second position is touched in step S110, the control section 20 determines whether or not the second position corresponds to an icon (step S115). Specifically, in the case where the second position does not overlap any of the positions at which icons are displayed as illustrated in the example of FIG. 2B, the control section 20 determines that the second position does not correspond to an icon. On the other hand, in the case where the second position overlaps a predefined position at which an icon is displayed (except for the first position) as illustrated in the example of FIG. 3B, the control section 20 determines that the second position corresponds to an icon. For example, in the example illustrated in FIG. 3B, the control section 20 determines that the second position corresponds to the icon B.

In the case where it is determined that the second position does not correspond to an icon in step S115, the control section 20 renumbers the icon at the first position (this icon is referred to as a first icon) so that the first icon is in the position in the array of icons specified by the second position and obtains temporary display positions (step S120). Specifically, in order to move the first icon to the position in the array of icons specified by the second position, the control section 20 first obtains: the first icon at the first position; and the icons just before and after the second position. For example, in the case where the second position is specified by touching with the index finger as illustrated in FIG. 2B, the icons just before and after the second position are the 4th and 5th icons in the array of icons. In the case where the second position is to the left of display position 4 or to the right of display position 3, the icons just before and after the second position are the 3rd and 4th icons in the array of icons. Next, the control section 20 obtains the current order of the array of icons, determines that the position of the icon just after the second position is the position in the array of icons specified by the second position, and moves the first icon to the position in the array of icons specified by the second position, thereby obtaining a temporary order of the array of icons. For example, in the case of the example illustrated in FIG. 2B, the icon A is moved to the 5th position in the array of icons which is the position in the array of icons specified by the second position, and the icons B and C are moved to the 6th and 7th positions respectively in the array of icons. Then, the control section 20 obtains, as temporary display positions, display positions 1 to 9 in which the icons are to be arranged in the temporary order. For example, in the case of the example illustrated in FIG. 2B, the temporary display positions for the icons A, B, and C are display positions 5, 6, and 7, respectively.

On the other hand, in the case where it is determined that the second position corresponds to an icon in step S115, the control section 20 swaps the first icon and the second icon and obtains temporary display positions (step S125). Specifically, in order to swap the first icon and the second icon, the control section 20 first obtains: the first icon at the first position; and the second icon at the second position. Furthermore, the control section 20 obtains the current order of the array of icons and swaps the positions of the first icon and the second icon to thereby obtain a temporary order of the array of icons. For example, when the second position, or the second icon assigned character B, is specified by touching with the index finger as illustrated in FIG. 3B, the control section 20 obtains the current order of the array of icons, determines that the position of the icon at which the second position exists is the position in the array of icons specified by the second position, and swaps the positions of the first icon and the second icon, thereby obtaining a temporary order of the array of icons. Then, the control section 20 obtains, as temporary display positions, display positions 1 to 9 in which the icons are to be arranged in the temporary order. For example, in the case of the example illustrated in FIG. 3B, the temporary display positions for the icons A and B are display positions 5 and 7, respectively.

Next, the control section 20 displays an animation of icons moving to the temporary display positions (step S130). Specifically, the control section 20 determines which of the icons displayed in step S100 are to be moved. Furthermore, the control section 20 obtains the original positions and temporary display positions (new positions) of the icons to be moved and moves the icons gradually from the original positions to the temporary display positions. That is, the control section 20 generates images representing the icons gradually moving frame by frame from the original positions to the temporary display positions and sends, sequentially to the touch panel display 40, image information representing the images of the respective frames, thereby causing the touch panel display 40 to display the animation of the icons moving to the temporary display positions.

For example, in the case of the example illustrated in FIG. 3B, the original positions of the icons A and B are display positions 7 and 5, respectively, and the temporary display positions of the icons A and B are display positions 5 and 7, respectively. Therefore, the control section 20 causes the touch panel display 40 to display an animation of the icon A moving from display position 7 to display position 5 and the icon B moving from display position 5 to display position 7, as illustrated in FIG. 3C. The squares with dashed lines in FIG. 3C schematically illustrate the trails of the icons. On the other hand, in the case of the example illustrated in FIG. 2B, the original positions of the icons A, B, and C are display positions 7, 5, and 6, respectively, and the temporary display positions of the icons A, B, and C are display positions 5, 6, and 7, respectively. Therefore, the control section 20 causes the touch panel display 40 to display an animation of the icon A moving from display position 7 to display position 5, the icon B moving from display position 5 to display position 6, and the icon C moving from display position 6 to display position 7, as illustrated in FIG. 2C. The squares with dashed lines in FIG. 2C schematically illustrate the trails of the icons.

Next, the control section 20 determines whether the touch operation at the second position has ended or not (step S135). Specifically, when the sensor of the touch panel display 40 stops sending information indicating that the second position is being touched, the control section 20 determines that the touch operation at the second position has ended. In the case where it is determined that the touch operation at the second position has not ended in step S135, the control section 20 determines whether the touch operation at the first position has ended or not (step S140). Specifically, when the sensor of the touch panel display 40 stops sending information indicating that the first position is being touched, the control section 20 determines that the touch operation at the first position has ended. In the case where it is determined that the touch operation at the first position has not ended in step S140, the control section 20 repeats the processes of step S135 and later steps.

On the other hand, in the case where it is determined that the touch operation at the second position has ended in step S135, the control section 20 determines that an instruction is made to cancel the display positions. The control section 20 displays the icons in the original positions (step S150).

Specifically, the control section 20 generates image information representing icons arranged in display positions 1 to 9 in the original order and sends the information to the touch panel display 40. For example, in the case where an animation of swapping the icons A and B as illustrated in FIG. 3C is displayed, the positions of the icons A and B are swapped as a result of the animation, as illustrated in FIG. 3D. However, since step S150 causes the icons to be displayed in the original positions, the icons return to the same state as in FIG. 3A (see FIG. 3F). In the case where an animation of the icon A moving to a position just before the icon B is displayed as illustrated in FIG. 2C, the icon A is displayed in the position before the icons B and C as illustrated in FIG. 2D as a result of the animation. However, since step S150 causes the icons to be displayed in the original positions, the icons return to the same state as in FIG. 2A (see FIG. 2F).

Figure 2E:
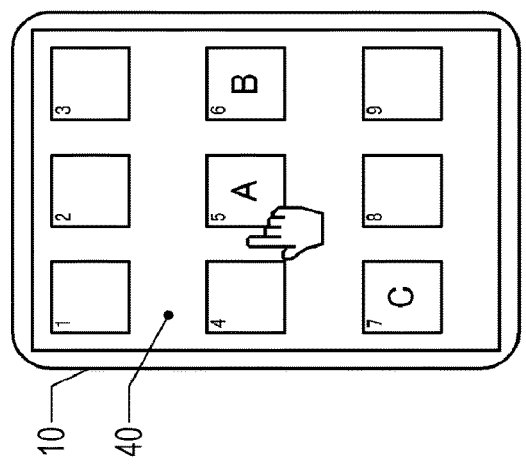

On the other hand, in the case where it is determined that the touch operation at the first position has ended in step S140, the control section 20 determines that an instruction is made to save the display positions, and does not perform step S150. Specifically, the control section 20 keeps the changed display positions resulted from the animation of step S130 and repeats the processes of step S105 and later steps. In this case, as a result of the animation illustrated in FIG. 3C, the positions of the icons A and B are swapped as illustrated in FIG. 3D. In the case where step S150 is not performed, the icons remain in the temporary display positions. That is, the positions of the icons are swapped as illustrated in FIG. 3E. In the case where the animation illustrated in FIG. 2C is displayed, the icon A is moved to the position before the icons B and C as illustrated in FIG. 2D as a result of the animation. In the case where step S150 is not performed, the icons remain in the temporary display positions. That is, the display positions are changed as illustrated in FIG. 2E.

Figure 2F:
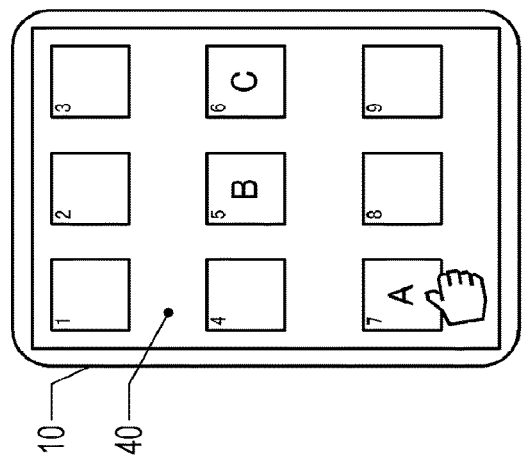

As has been described, in the present embodiment, with the determination in steps S135 and S140 and the process in step S150, the control section 20 determines whether to perform or cancel the process on the basis of the order in which the touch operations performed on the touch panel display 40 have ended. That is, in the case where the touch operation at the first position has ended before the touch operation at the second position has ended, the changed display positions are saved (FIGS. 2E and 3E) and, on the other hand, in the case where the touch operation at the second position has ended before the touch operation at the first position has ended, the change of the display positions is cancelled (FIGS. 2F and 3F). Therefore, the user can provide as a single gesture an instruction to save the change or cancel the change after the operation of specifying the positions of icons.

(3) Other Embodiments

The above-described embodiments are examples of the implementation of the invention. Various other embodiments can also be employed, provided that, when the first position is touched and one or more other positions are touched while the first position is touched, a process is performed in association with the first icon and the one or more other positions. The input/output controller can be included in various devices in addition to the smartphone 10. Examples of such devices include various computers such as mobile terminals, tablet terminals, and printers. Furthermore, the above-described functions can be realized by programs of operating systems (OS) of the devices or can be realized by programs such as application programs which run on operating systems. Furthermore, the control section of the input/output controller can be included in the touch panel display 40 or any other devices. The touch panel display 40 can be one that can detect a finger or the like even when the finger or the like is not actually in contact with the screen. In this case, even when the finger or the like is not actually in contact with the screen, a gesture of specifying an icon displayed on the screen is also considered a "touch operation" of the invention. Furthermore, although the above-described embodiments discussed examples in which the icons are moved according to the user's operation, this does not imply any limitations. Various other processes can be performed according to the user's operations described earlier. Examples include: a configuration in which data indicated by the first icon is opened in an application indicated by the second icon according to the user's operation; and a configuration in which image data indicated by the first icon is printed by the printer indicated by the second icon according to the user's operation.

The following configuration can also be employed: a process readily recognizable to a user, such as changing the position of an icon, is not performed upon touching the icon, but the process readily recognizable to the user is started when the touch has ended which serves as an instruction to save the changed position of the icon. It should be noted that, in the case where the touch has ended which serves as an instruction to cancel the changing of the position of the icon, the process readily recognizable to the user is not performed. In the above case, the following configuration can be employed: upon touching the icon, a preliminary process not readily recognizable to the user is performed and, when the touch has ended which serves as an instruction to perform the process readily recognizable to the user, the process readily recognizable to the user is started. The process readily recognizable to the user can also be referred to as an external process whose results are visible from the outside. Examples of such a process include a process of moving icons and a process of printing image data with a printer. The process not readily recognizable to the user can also be referred to as an internal process whose results are not visible from the outside. Examples of such a process include: a process of creating a table indicating the positions to which the icons are to be moved; and a process of converting image data into a printable form. In this case, when the touch has ended which serves as an instruction to cancel the process not readily recognizable to the user, the process not readily recognizable to the user is stopped and the created table or print data or the like is deleted.

The above-described embodiments discussed animations of moving icons from the original positions to new positions. Needless to say, the animations are not limited to such. For example, the animation can be an animation of shaking of touched icons or shaking of icons which can be moved, or can be an animation of changing colors, or the like. Alternatively, the following configuration can also be employed: in the case where the second position is on the second icon, the first icon is moved to the second position and, in parallel with the movement, each of the second and later icons is moved by one position.

The number of icons to be touched can be three or more. Specifically, the following configuration can be employed: the control section 20 determines positions into which the icons are to be rearranged on the basis of the order in which the first position and one or more other positions are touched and performs a process of rearranging the icons into the determined positions. This configuration can be achieved by the control section 20 performing the process on the basis of three or more touched positions with the use of the hardware structure illustrated in FIG. 1A.

FIGS. 4A to 4F illustrate examples of the content displayed on the touch panel display 40 in the case where, when a first icon (assigned character A), a second icon (assigned character B) and a third icon (assigned character C), which are at the first to third positions, are touched, the first icon, the second icon, and the third icon are rearranged into new positions. Specifically, in the case where the first icon displayed in display position 7 is touched with the thumb as illustrated in FIG. 4A and then the second icon displayed in display position 5 is touched with the index finger as illustrated in FIG. 4B and then the third icon displayed in display position 9 is touched with the middle finger as illustrated in FIG. 4C, the control section 20 obtains the positions of the first icon, the second icon, and the third icon as the first position, the second position, and the third position.

In this case, the control section 20 assumes that the first to third icons displayed at the first to third positions are in a cyclic sequence (a sequence in which the last icon is connected to the first icon) and, in the case where an instruction to perform the process of changing the positions is made, rearranges the icons by moving each icon by one position in the cyclic sequence. Specifically, in the example illustrated in FIG. 4C, when each of the first to third icons displayed in display positions 7, 5, and 9 is moved by one position, the icons are rearranged in the order of the third icon, the first icon, and the second icon. The control section 20 changes the order by using such a cyclic sequence and determines that the new positions of the first to third icons are the 5th, 9th, and 7th positions in the array of icons. As a result, display positions 5, 9, and 7 are determined as the temporary positions for the first to third icons.

Then, the control section 20 displays an animation of the icons moving from the original positions to new positions, as illustrated in FIG. 4D. In the case where the touch operation at the first position is ended by the user as illustrated in FIG. 4E, the control section 20 saves the temporary display positions of the icons. On the other hand, in the case where the touch operation at at least one of the second and third positions is ended by the user, the control section 20 cancels the temporary display positions as illustrated in FIG. 4F and returns the icons to the same positions as in FIG. 4A. With this configuration, the user can rearrange multiple icons into new positions in a small number of operations.

What is claimed is:

1. An input/output controller for rearranging icons indicative of applications within a user interface, the input/output controller comprising:
    a touch panel display; and
    a control section including a processor, the control section configured to:
        cause the touch panel display to display the user interface, the user interface including a plurality of icons, amongst which a first icon is displayed at a first display position within a first position;
        monitor the touch panel display to detect a first touch operation within the first position, wherein the first touch operation is performed with a first finger or the like;
        monitor the touch panel display to detect a second touch operation at an other position, wherein the other position is not within the first position, and wherein the first touch operation has not ended, and the second touch operation remains at the other position, the first and second touch operations being separate touch operations, and wherein the second touch operation is performed with a second finger or the like;
        monitor the touch panel display to detect a third touch operation within a third position, wherein a third icon is displayed at a third display position within the third position;
        cause the first icon to move and be displayed at, or proximate to, the other position based on the second touch operation being detected while the first touch operation has not ended, and cause at least one icon, other than the first icon, that was not displayed at the first position to shift to a new position based on the first icon's movement;
        determine, on a basis of an order in which the first touch operation within the first position and the third touch operation within the third position are ended, positions into which the first icon and the third icon are to be conclusively positioned; and
        conclusively positioning the first icon and the third icon into the determined positions.

2. The input/output controller according to claim 1, wherein, when the second touch operation is ended while the first touch operation is being held, the control section is configured to cause the first icon to return to the first display position.

3. The input/output controller according to claim 1, wherein the touch panel display can detect the first touch operation even when the first finger or the like is not actually in contact with the touch panel display.

4. The input/output controller according to claim 1, wherein the touch panel display can detect the second touch operation even when the second finger or the like is not actually in contact with the touch panel display.

5. The input/output controller according to claim 1, wherein the new position to which the at least one icon shifts based on the first icon's movement, is a predefined position on the touch panel display.

6. The input/output controller according to claim 1, wherein when the first icon moves to be positioned at, or proximate to, the other position, a temporary display position of the first icon is illustrated.

7. The input/output controller according to claim 1, wherein when the first icon moves to be positioned at, or proximate to, the other position, the first icon is animated.

8. The input/output controller according to claim 1, wherein the control section is further configured to:
    cause the first icon to be conclusively positioned at, or proximate to, the other position further based on the first touch operation being removed; and
    cause the first icon to return to the first position based on the second touch operation being removed before the first touch operation is removed.

9. The input/output controller according to claim 1, wherein, when the first icon moves to the other position, the first icon is animated.

10. The input/output controller according to claim 1, wherein, as the first icon is moving toward the other position, trails of the first icon are illustrated.

11. The input/output controller according to claim 1, wherein, when the first icon moves to be positioned at, or proximate to, the other position, a temporary display position of the first icon is illustrated.

12. The input/output controller according to claim 1, wherein the first touch operation comprises a touch operation on the touch panel display using either a finger or a thumb.

13. The input/output controller according to claim 1, wherein the second touch operation comprises a touch operation on the touch panel display using either a finger or a thumb.

14. The input/output controller according to claim 1, wherein the at least one icon comprises the third icon.

15. The input/output controller according to claim 1, wherein the at least one icon comprises a second icon.

16. The input/output controller according to claim 1, wherein a second icon is displayed at a second display position within the other position.

17. The input/output controller according to claim 1, wherein:
    the determined position into which the first icon is to be conclusively positioned is the other position;
    the determined position into which the third icon is to be conclusively positioned is the first position; and
    the new position is the third position.

18. An input/output controller for rearranging icons indicative of applications within a user interface, the input/output controller comprising:
    a touch panel display; and
    a control section including a processor, the control section configured to:
        cause the touch panel display to display the user interface, the user interface including a plurality of icons, amongst which a first icon is displayed at a first display position within a first position;

monitor the touch panel display to detect a first touch operation within the first position, wherein the first touch operation is performed with a first finger or the like;
while the first touch operation remains, monitor the touch panel display to detect a second touch operation at an other position on the touch panel display, wherein the other position is not within the first position, and wherein the second touch operation is performed with a second finger or the like;
monitor the touch panel display to detect a third touch operation within a third position, wherein a third icon is displayed at a third display position within the third position;
cause the first icon to move and be displayed at, or proximate to, the other position based on the second touch operation being detected while the first touch operation is being held, and cause at least one icon, other than the first icon, that was not displayed at the first position to shift to a new position based on the first icon's movement;
determine, on a basis of an order in which the first touch operation within the first position and the third touch operation within the third position are ended, positions into which the first icon and the third icon are to be conclusively positioned; and
conclusively positioning the first icon and the third icon into the determined positions.

19. The input/output controller according to claim 18, wherein, when the second touch operation is ended while the first touch operation is being held, the control section is configured to cause the first icon to return to the first display position.

20. The input/output controller according to claim 18, wherein the touch panel display can detect the first touch operation even when the first finger or the like is not actually in contact with the touch panel display.

21. The input/output controller according to claim 18, wherein the touch panel display can detect the second touch operation even when the second finger or the like is not actually in contact with the touch panel display.

22. The input/output controller according to claim 18, wherein the new position to which the at least one icon shifts based on the first icon's movement, is a predefined position on the touch panel display.

23. The input/output controller according to claim 18, wherein when the first icon moves to be positioned at, or proximate to, the other position, a temporary display position of the first icon is illustrated.

24. The input/output controller according to claim 18, wherein when the first icon moves to be positioned at, or proximate to, the other position, the first icon is animated.

25. The input/output controller according to claim 18, wherein, when the first icon moves to the other position, the first icon is animated.

26. The input/output controller according to claim 18, wherein, when the first touch operation is removed before the second touch operation is removed, the control section is configured to cause the first icon to stay at a position corresponding to the other position, whereas the first icon is returned to the first position if the second touch operation is removed before the first touch operation is removed.

27. The input/output controller according to claim 18, wherein, as the first icon is moving toward the other position, trails of the first icon are illustrated.

28. The input/output controller according to claim 18, wherein, when the first icon moves to be positioned at, or proximate to, the other position, a temporary display position of the first icon is illustrated.

29. The input/output controller according to claim 18, wherein the first touch operation comprises a touch operation on the touch panel display using either a finger or a thumb.

30. The input/output controller according to claim 18, wherein the second touch operation comprises a touch operation on the touch panel display using either a finger or a thumb.

31. The input/output controller according to claim 18, wherein the at least one icon comprises the third icon.

32. The input/output controller according to claim 18, wherein the at least one icon comprises a second icon.

33. The input/output controller according to claim 18, wherein a second icon is displayed at a second display position within the other position.

34. The input/output controller according to claim 18, wherein:
the determined position into which the first icon is to be conclusively positioned is the other position;
the determined position into which the third icon is to be conclusively positioned is the first position; and
the new position is the third position.

35. An input/output controller for rearranging icons indicative of applications within a user interface, the input/output controller comprising:
a touch panel display; and
a control section including a processor, the control section configured to:
cause the touch panel display to display the user interface, the user interface including a plurality of icons, amongst which a first icon is displayed at a first display position within a first position;
monitor the touch panel display to detect a first touch operation within the first position;
while the first touch operation remains within the first position, monitor the touch panel display to detect a second touch operation within a second position, wherein a second icon of the plurality of icons is displayed within the second position and the second position is different than the first position, the first and second touch operations being separate touch operations;
monitor the touch panel display to detect a third touch operation within a third position, wherein a third icon is displayed at a third display position within the third position;
cause the first icon to move and be displayed within the second position based on the second touch operation being detected while the first touch operation is being held, and cause the second icon to shift from within the second position to a new position based on the first icon's movement;
determine, on a basis of an order in which the first touch operation within the first position and the third touch operation within the third position are ended, positions into which the first icon and the third icon are to be conclusively positioned; and
conclusively positioning the first icon and the third icon into the determined positions.

36. The input/output controller according to claim 35, wherein the first touch operation on the touch panel display is performed with a first finger or the like.

37. The input/output controller according to claim 36, wherein the touch panel display can detect the first touch operation even when the first finger or the like is not actually in contact with the touch panel display.

38. The input/output controller according to claim 35, wherein the second touch operation on the touch panel display is performed with a second finger or the like.

39. The input/output controller according to claim 38, wherein the touch panel display can detect the second touch operation even when the second finger or the like is not actually in contact with the touch panel display.

40. The input/output controller according to claim 35, wherein the second icon is moved by one position to the new position.

41. The input/output controller according to claim 35, wherein when the first icon moves to be positioned within the second position, a temporary display position of the first icon is illustrated.

42. The input/output controller according to claim 35, wherein the control section is further configured to:
   cause the first icon to be conclusively positioned at, or proximate to, the second position further based on the first touch operation being removed; and
   cause the first icon to return to the first position based on the second touch operation being removed before the first touch operation is removed.

43. The input/output controller according to claim 35, wherein, when the first icon moves to the second position, the first icon is animated.

44. The input/output controller according to claim 35, wherein, as the first icon is moving toward the second position, trails of the first icon are illustrated.

45. The input/output controller according to claim 35, wherein, when the first icon moves to be positioned at, or proximate to, the second position, a temporary display position of the first icon is illustrated.

46. The input/output controller according to claim 35, wherein the first touch operation comprises a touch operation on the touch panel display using either a finger or a thumb.

47. The input/output controller according to claim 35, wherein the second touch operation comprises a touch operation on the touch panel display using either a finger or a thumb.

48. The input/output controller according to claim 35, wherein:
   the determined position into which the first icon is to be conclusively positioned is the second position;
   the determined position into which the third icon is to be conclusively positioned is the first position; and
   the new position is the third position.

* * * * *